Jan. 4, 1944.  E. M. MOREHOUSE  2,338,660
CONDUIT SUPPORTING BLOCK AND BRACKET THEREFOR
Filed Nov. 2, 1942
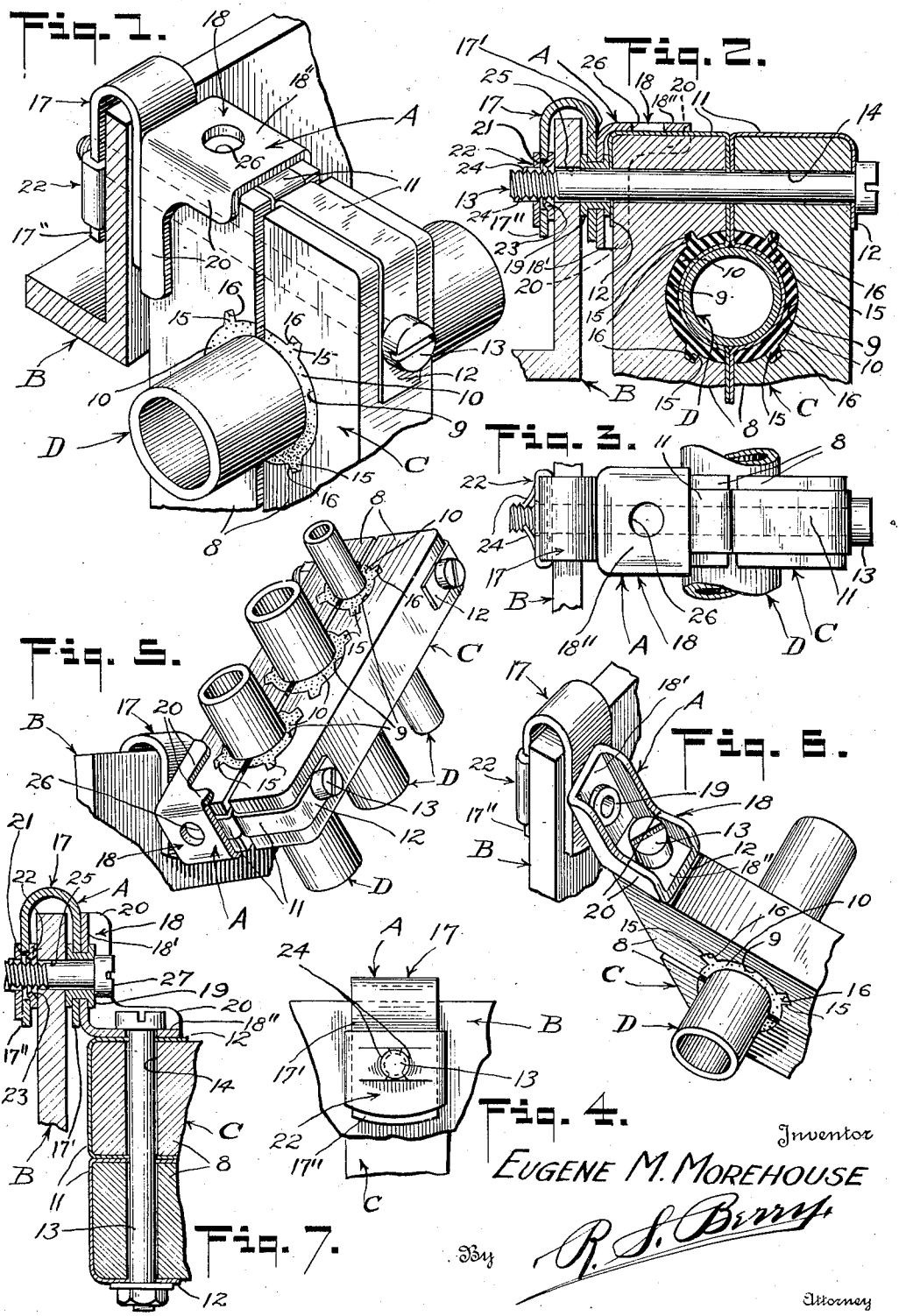
Inventor
EUGENE M. MOREHOUSE
By R. S. Berry
Attorney Patented Jan. 4, 1944

2,338,660

UNITED STATES PATENT OFFICE 2,338,660

CONDUIT SUPPORTING BLOCK AND BRACKET THEREFOR

Eugene M. Morehouse, Tujunga, Calif., assignor to Adel Precision Products Corp., a corporation of California Application November 2, 1942, Serial No. 464,277

9 Claims. (Cl. 248—68)

This invention relates in general to blocks for supporting groups of conduit lines in aircraft on cushioned and electrically bonded seats as exemplified in United States Letters Patent No. 2,227,528, issued to Paul W. Adler on January 7, 1941, and more particularly to a bracket and block-bracket combination for facilitating the installation of conduit supporting blocks.

Heretofore it has been difficult, if not impossible in some instances, to install the conduit blocks in confined and cramped places where supporting blocks should be mounted. This is due to the use of the bolts which clamp to block sections on the conduit, as a means for securing the block to a structural part of the airplane and the necessity of holding a nut behind or against said structural part so that the block may be mounted thereon.

In many instances it is difficult, if not impossible, to hold the nut in proper position and even if adequate "nut holding" space is afforded the operator must hold the nut in place with one hand and insert the bolt with the other hand instead of having the use of both hands as is desirable to effect the insertion of the bolt and complete the installation.

The practice of using a bolt which holds the block sections together on the conduits, as a means for securing the block to a structural part of the aircraft makes it difficult, if not impossible, to make sub-assembly installations which are desirable in present day aircraft construction.

It is a primary object of the present invention to provide a mounting bracket for blocks of the character described which makes it possible to readily and easily secure the block on aircraft structural parts in confined and cramped spaces and wherein the position or angular disposition or shape of the structural part precludes or makes extremely difficult the attachment of an ordinary block thereto in the manner and with the means heretofore employed.

Another object of my invention is to provide a bracket of the character described which as a unit separated from the block or mounted on the block as a part thereof may be clasped on an edge of a structural part and will remain therein without the use of extraneous fastenings, in proper position while the block is fixed thereto and the bracket is secured to said structural part, or while the bracket, if carried by the block, is being secured or bolted to said structural part.

A further object is to provide a bracket of the character described which includes pivotally connected parts one of which is adapted to be clasped on an airplane structural part and the other clasped or mounted on the conduit supporting block, whereby the conduit and bracket may be relatively adjusted for installation in various positions and angles best suited to the position, shape and disposition of the particular structural part on which the bracket is mounted; said adjustable two part bracket also permitting of securing the bracket to the structural part with one of the regular block bolts or with a separate fastening so that in the latter case the blocks may be first properly clamped on the conduits to provide a subassembly which is thereafter secured to the structural part by means of the block-carried brackets and said separate fastenings.

Another important object of my invention is to provide a bracket such as described which carries a nut thereon in position to be readily threadedly engaged with a bolt or screw employed to fasten the bracket to a structural part of the aircraft, it being unnecessary for the operator to hold the nut in place as was the practice heretofore.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a fragmentary perspective view of a block-bracket unit embodying my invention;

Fig. 2 is a fragmentary vertical sectional view of the invention shown in Fig. 1;

Fig. 3 is a fragmentary top plan view of the block-bracket unit of Figs. 1 and 2;

Fig. 4 is a fragmentary rear elevation of the unit showing the nut on the bracket;

Fig. 5 is a fragmentary perspective view of the block-bracket unit as when the bracket is adjusted to effect an angular disposition of the block and conduits;

Fig. 6 is a fragmentary perspective view of a modified form of the invention whereby the same bracket as in Figs. 1 to 5 is used but is adjusted and applied to the block in a different manner;

Fig. 7 is a fragmentary vertical sectional view of the unit shown in Fig. 6 with bracket adjusted to a different position from that shown in Fig. 6 but fastened to the block in the same manner.

Referring to the drawing more specifically, it is seen that one embodiment of my invention generally includes a bracket A adapted to be secured to a metallic structural part B and to a sectional block C for supporting conduits D.

The block B as here shown comprises opposed rectangular block sections 8 having complementary conduit-receiving grooves or channels 9 extending transversely of opposed faces thereof and provided with cushion strips 10 of compressible, insulation material within said channels as seats for the conduits.

Bonding strips 11 of suitable metal are mounted between the blocks 8 so as to line the channels 9 and contact the conduits C. The ends 12 of these strips are extended around the ends of blocks 8 and are apertured so that the bolts 13 for clamping the blocks on the conduits may be passed through said apertured ends and bolt holes 14 in the blocks, and brought into contact with said strips, said bolts serving as conductors for bonding the conduits to the metal structural part B.

As here provided the blocks 8 are made of rigid non-strategic material such as wood, plastic material, or the like, thereby conserving rubber or synthetic rubber compared to the type of block shown in the aforesaid Adler patent. But relatively small amounts of synthetic rubber or the like are used in employing the small individual cushion strips 10. These strips are held in place by means of ribs 15 therein fitted into grooves 16 in the blocks 8.

The bracket A hereof comprises a generally U-shaped resilient metal clasp member 17 and a generally L-shaped metal member 18. The legs 17' and 18' of these members are pivotally joined by means of a hollow rivet 19. The U-shaped member 17 is adapted to be clasped on the structural part B as shown in Figs. 1 and 2 while the L-shaped member 18 is adapted to be secured to a corner or end portion of the block C as shown in Figs. 1, 2, 6 and 7.

The leg 17" of the U-shaped bracket member 17 is provided at its free end with an opening 21 with which is registered the opening through a special form of sheet metal nut 22. This nut is clipped around the leg 17" and has indented key portions 23 engaged in the opening 21 to hold it in place with its two opposed spring tongues 24 positioned to threadedly engage a bolt which is inserted through the bracket, the opening 25 in the structural part B, and the nut 22 as shown in Figs. 2, 3, and 4. A nut mounted on the bracket as here provided will make it unnecessary for the operator to hold a nut in place behind or against the structural part as was the practice heretofore.

Considering the arrangement shown in Figs. 1 to 5 inclusive, it is seen that the bolt 13 for clamping the blocks 8 on the conduits C passes through the hollow rivet 19, the opening 25 in the airplane structural part B, the opening 21 and the nut 22 and may be screwed up to tighten the assembly and secure the bracket in place as well as the block sections.

In this arrangement the L-shaped member 18 closely embraces and grips a corner of the block so that the rivet and nut are aligned with the bolt hole 14 ready to receive the bolt.

The bracket as a separate unit may be clasped on the structural part B with its opening in alignment with the opening 25 therein and will be held thereon due to the frictional gripping action of the U-shaped clasp member 17. Before the block is attached to the member 18 of the bracket said member may be swung into the desired position on the pivot provided by the hollow rivet 19. If desired, the block after attachment thereof to the bracket, may be swung on the pivot 19 to the desired position.

If the bracket is first applied to the block and the bolt 13 is inserted but part way through the hollow rivet the bracket will be held on the block as a pre-assembled part, the gripping action of the flanges 20 also holding the bracket on the block. With the parts thus assembled the U-shaped member 17 of the bracket may be readily hooked or clipped onto the structural part 2 in proper relation to the opening 25 therein to temporarily hold the assembly in place and make it possible for the operator to use both hands to complete the insertion and screwing up of the bolt, thereby easily completing the installation of the block.

As shown in Figs. 6 and 7 the bracket is adjusted so that L-shaped member 18 is turned 180° compared to its position in Figs. 1 to 6. This brings the leg 18" of member 18 at the lower end of the leg 17' of member 17 and in position to be secured on the end of block by means of the bolt 13, there being an opening 26 in the free end of leg 18" to accommodate said bolt.

In this arrangement of my bracket the bracket is secured to the structural part B by means of a short bolt 27 and it should be noted that the use of this small extra bolt makes possible a highly desirable sub-assembly installation of conduit blocks, inasmuch as the bolts 13 for clamping the blocks on the conduit are not used to secure the bracket to the aircraft structure but to secure the bracket to the blocks. This makes it possible to assemble a group of blocks and conduits with the blocks finally clamped and positioned to the conduits and to thereafter secure the brackets on the aircraft structure. In installing this sub-assembly it is possible to adjust the clasps 17 of the brackets as desired to dispose them in various positions and angles so that they may be clasped on variously extended or positioned structural parts along the length of the sub-assembly.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a bracket for supporting a conduit-embracing block, a substantially U-shaped clasp member adapted to embrace a support, an angular member having one leg thereof mounted on one leg of said clasp member and its other leg adapted to be secured to said block.

2. In a bracket for securing a conduit-supporting block to a support, a clasp member adapted to embrace a support, and a substantially L-shaped member pivoted on said clasp member and adapted to be adjusted to position to embrace and be secured to a corner of the block or to position in which only one leg thereof is disposed to be secured to the block.

3. In a bracket for securing a conduit-supporting block to a support, a clasp member adapted to embrace a support, a substantially L-shaped member pivoted on said clasp member and adapted to be adjusted to position to embrace and be secured to a corner of the block or to position in which only one leg thereof is disposed to be secured to the block, said clasp member and said L-shaped member having apertures therein aligned with one another and adapted to register with an aperture in said support, and a nut carried by said clasp member for threadedly engaging a fastening inserted through said aligned apertures.

4. In a bracket for securing a conduit-supporting block to a support, a clasp member adapted to embrace a support and having apertures adapted to register with apertures in said support, a block-supporting member, a hollow rivet pivotally securing said block-supporting member to said clasp member through one of the apertures in said clasp member so that the bore through the rivet is aligned with the other aperture in said clasp member, and fastening means passing through said rivet and other aperture for securing the bracket to said support.

5. In a bracket for securing a conduit-supporting block to a support, a clasp member adapted to embrace a support and having apertures adapted to register with apertures in said support, a block-supporting member, a hollow rivet pivotally securing said block-supporting member to said clasp member through one of the apertures in said clasp member so that the bore through the rivet is aligned with the other aperture in said clasp member, fastening means passing through said rivet and other aperture for securing the bracket to said support, and a nut carried by said clasp member in position to engage said fastening means.

6. In a bracket for securing a conduit-supporting block to a support, a clasp member adapted to embrace a support, a substantially L-shaped member pivoted on said clasp member and adapted to be adjusted to position to embrace and be secured to a corner of the block or to position in which only one leg thereof is disposed to be secured to the block, and side flanges on the longitudinal edges of the legs of said L-shaped member adapted to engage opposite faces of said block.

7. In a conduit-supporting device, opposed blocks adapted to clamp and support conduits therebetween, bolts passing through and securing said blocks together, a clasp member adapted to embrace a support and having apertures adapted to align with an aperture in said support, and a block-attaching member mounted on said clasp member in position to be secured to one of the blocks, and having an aperture through which one of said bolts extends.

8. In a conduit-supporting device, opposed blocks adapted to clamp and support conduits therebetween, bolts passing through and securing said blocks together, a clasp member adapted to embrace a support and having apertures adapted to align with an aperture in said support, and a block-atttaching member mounted on said clasp member in position to be secured to one of the blocks, and having an aperture through which one of said bolts extends, said one bolt also passing through the apertures in said clasp member for securing the clasp member to said support.

9. In a conduit supporting device, opposed blocks adapted to clamp and support conduits therebetween, bolts passing through and securing said blocks together, a clasp member adapted to embrace a support and having apertures adapted to align with an aperture in said support, a block-attaching member mounted on said clasp member in position to be secured to one of the blocks, and having an aperture through which one of said bolts extends, said attaching member having another aperture therein aligned with the apertures of said clasp member, and a bolt inserted through the last apertures of said attaching member and the apertures in the support and said clasp to secure the clasp to the support.

EUGENE M. MOREHOUSE.